Patented July 23, 1946

2,404,353

UNITED STATES PATENT OFFICE 2,404,353

REMOVABLE COATING COMPOSITION

Harry K. Ash, Cincinnati, Ohio, assignor to Interchemical Corporation, New York, N. Y., a corporation of Ohio No Drawing. Application July 28, 1943,
Serial No. 496,473

5 Claims. (Cl. 106—189)

This invention aims to provide a temporary protective coating for soft plastic surfaces, characterized by the ability to strip cleanly from the surface even after a prolonged period of time.

In the aircraft industry in particular, sheets of thermoplastics such as "Plexiglas" and "Lucite" (methacrylate polymers) and cellulose acetate, are used as window materials. They are generally formed to shape by heat of the order of 250 to 350° F., combined with pressure. It is essential that they be protected against scratching during the forming operation, and during handling before assembly, as scratches interfere with vision; removal of scratches by buffing may cause distortion by variation in thickness. Hence, elaborate precautions have been used to protect the sheets. Because paper and similar protecting devices have been hard to handle, investigators have attempted to deposit strippable films on the plastic. Poor stripping, sticking in the molds, and deleterious action on the plastic, have contributed to the failure of the known stripping lacquers.

I have discovered how to produce lacquers which produce satisfactory strippable protective films on thermoplastic sheets. These lacquers consist essentially of solutions of low viscosity (10 centipoise) ethyl cellulose of standard ethoxy content (ca. 47%) in solvents preferably consisting of alcohols and petroleum hydrocarbons, and plasticized with from about 25% to 50% of plasticizer, based upon the weight of the ethyl cellulose. If desired, a stripping agent (such as carbitol citrate of Alumileaf) may be incorporated in the composition.

The most important consideration in a stripping lacquer for thermoplastics is that the lacquer have no effect on the plastic. A prime consideration is solvent; it is important that the solvent in the lacquer be a non-solvent for the thermoplastic to be used. For universal application, I have found a mixture of petroleum naphthas and lower water-immiscible volatile aliphatic alcohols (e. g. butyl, amyl, hexyl), but not below butyl (no ethyl or methyl) to be most desirable. Where cellulose acetate is to be the base material, other hydrocarbons, such as the coal-tar distillates, may be used; but I prefer to use the petroleum naphtha-alcohol combination for all purposes.

Another important consideration is that the film of stripping lacquer shall not be as thermoplastic as the sheet it protects, else it will stick in the mold, or fuse to the sheet, during the forming operation. I obtain this result by not plasticizing my ethyl cellulose above about 50%, and by choice of ingredients, and by pigmentation.

A third important consideration in my new compositions stems from my discovery of the fact that a stripping lacquer, in order to be satisfactory, must deposit a film of at least about 1 mil in dry thickness; thinner films do not strip properly no matter how strong the film is. This necessity for a thick film in one coat requires high solids in the lacquer. High solids are ordinarily attained by the use of low viscosity cellulose derivative, combined with large quantities of plasticizer or resin. Such normal high solids lacquers are, however, not useable as stripping lacquers, because of their formulation, being generally too adherent, as well as either soft (too much plasticizer) or brittle (too much resin) for proper stripping. In order to get the necessary high solids, I use viscosities much above those commonly applied. I find a minimum viscosity of 50 seconds in a No. 4 Ford cup at 70° F. to be essential in producing the desired film thickness. Spraying lacquers may go up to 100 seconds viscosity, brushing lacquers up to 200 seconds. These viscosities compare with the approximate 20 second viscosities preferred in ordinary spraying lacquers.

Typical examples of my invention are the following:

*Example 1.—General type formulation*

| | Parts by weight |
|---|---|
| Ethyl cellulose—10 centipoise standard ethoxy | 12.00 |
| Dow plasticizer No. 6 (di(o-xenyl) mono phenyl phosphate) | 2.00 |
| Neville's P. H. O. oil (viscous cumarone-indene phenol condensate) | 4.00 |
| n-Butyl alcohol | 21.00 |
| Troluoil (petroleum distillate of toluene evaporation rate) | 61.00 |

Viscosity 105 seconds in a No. 4 Ford cup at 70° F.

This may be used on both acetate and methacrylate sheets.

*Example 2*

| | Parts by weight |
|---|---|
| Ethyl cellulose 10 centipoise standard ethoxy | 12.50 |
| Dow plasticizer No. 6 | 4.00 |
| Ethyl alcohol | 10.00 |
| n-Butyl alcohol | 15.00 |
| Toluol substitute | 35.50 |
| Solvent naphtha | 21.00 |
| Alumileaf (stripping agent) | 2.00 |

This formulation cannot be used on methacrylate plastics; it is highly useful on cellulose acetate.

Viscosity 66 seconds in a No. 4 Ford cup at 70° F.

*Example 3—Colored lacquer*

| | Parts by weight |
|---|---|
| Ethyl cellulose 10 centipoise standard ethoxy | 12.50 |
| Dow plasticizer No. 6 | 4.00 |
| Ethyl alcohol | 10.00 |
| n-Butyl alcohol | 15.00 |
| Toluol substitute | 35.20 |
| Solvent naphtha | 21.00 |
| Carbitol citrate | 2.00 |
| Red dye solution (Safranine A) | .30 |

This formula is similar to Example 2, and its use is similarly restricted.

Viscosity 66 seconds in a No. 4 Ford cup at 70° F.

I have also found that a small amount of pigment in the formula improves the ability of the film to withstand drawing and forming. This pigmentation also has the effect of producing a film which can be marked on with a pencil, etc., for layout purposes. I may use a small amount (from about 1 to 5%) of an inert extender pigment such as silica aerogel, calcium sulfate, calcium carbonate, barytes, clay, diatomaceous earths, magnesium silicate, or other known inerts. A typical example of such a material, which is suitable for both methacrylate and acetate plastics is the following:

*Example 4*

| | Parts by weight |
|---|---|
| Silica aerogel | 8.20 |
| Surfex | 2.35 |
| Ethyl cellulose 10 centipoise standard ethoxy | 7.25 |
| Dow plasticizer No. 6 | 1.30 |
| n-Butanol | 20.30 |
| Troluoil | 60.60 |

The above is ground to a paste of suitable fineness, and is made into a finished lacquer as follows:

| | Parts by weight |
|---|---|
| Above paste | 14.97 |
| Ethyl cellulose 10 centipoise standard ethoxy | 8.85 |
| Troluoil | 54.82 |
| Butanol | 17.97 |
| Hercolyn | 2.60 |
| Zone oil | .52 |
| Dye solution | .27 |

Viscosity 60 seconds in a No. 4 Ford cup at 70° F.

The examples may be multiplied indefinitely without departing from the scope of the invention, which is defined in the claims.

I claim:

1. A lacquer which will deposit a permanently strippable film of at least 1 mil thickness in a single application, which film can be stripped from a sheet of cellulose acetate thermoplastic without injury thereto, consisting essentially of a binder and a solvent, the binder consisting essentially of ethyl cellulose of 10 centipoise viscosity and approximately 47% ethoxy content, plasticized with from about 25 to 50% of its weight of plasticizer, the solvent consisting entirely of alcohols and hydrocarbons, the lacquer being further characterized by a viscosity between 50 and 200 seconds in a No. 4 Ford cup at 70° F.

2. The lacquer of claim 1, in which a stripping agent is included in amount varying from about three tenths of a percent to about three percent.

3. The lacquer of claim 1, in which a small amount of coloring matter is incorporated.

4. A lacquer which will deposit a permanently strippable film of at least 1 mil thickness in a single spray application to methyl methacrylate plastic sheeting, consisting essentially of a binder and a solvent, the binder consisting essentially of ethyl cellulose of 10 centipoise viscosity and approximately 47% ethoxy content, plasticized with from about 25 to 50% of its weight of plasticizer, the solvent consisting entirely of alcohols and hydrocarbons, the lacquer being further characterized by a viscosity between 50 and 100 seconds in a No. 4 Ford cup at 70° F.

5. A lacquer as described in claim 4, having the additional property of resistance to die-forming and ability to be marked, consisting of the lacquer of claim 4 and from 1 to 5% of an inert extender pigment dispersed therein.

HARRY K. ASH.